(12) United States Patent
Chou

(10) Patent No.: US 7,895,023 B2
(45) Date of Patent: Feb. 22, 2011

(54) SIMULATION SYSTEM AND METHOD FOR ESTABLISHING RESERVOIR OPERATIONAL RULE CURVES

(76) Inventor: Frederick Chou, 2F-8, No. 8, Lane 21, Chuang-Ching Rd., Tung Dist., Tainan City (TW)

( * ) Notice: Subject to any disclaimer, the term of this patent is extended or adjusted under 35 U.S.C. 154(b) by 876 days.

(21) Appl. No.: 11/586,946

(22) Filed: Oct. 26, 2006

(65) Prior Publication Data

US 2007/0112550 A1    May 17, 2007

(30) Foreign Application Priority Data

Nov. 2, 2005    (TW) ................................ 94138069 A

(51) Int. Cl.
*G06G 7/48* (2006.01)
(52) U.S. Cl. ............................................. 703/10; 703/9
(58) Field of Classification Search ..................... 703/9, 703/22; 705/7
See application file for complete search history.

(56) References Cited

U.S. PATENT DOCUMENTS

| | | | | |
|---|---|---|---|---|
| 6,002,863 | A * | 12/1999 | Sheer et al. | 703/22 |
| 6,134,952 | A * | 10/2000 | Garver et al. | 73/61.71 |
| 6,581,027 | B1 * | 6/2003 | Sheer et al. | 703/9 |
| 7,031,927 | B1 * | 4/2006 | Beck et al. | 705/7 |

OTHER PUBLICATIONS

K. D. W. Nadalal, R. Sakthivadivel Planning and management of a complex water resource system: case of Samanalawewa and Undawalawe reservoirs in the Walawe river, Sri Lanka Agriculture Water Management 57, 2002 Elsevier Science, pp. 207-221.*
Daniel P. Ames, Bethany T. Neilson, David K. Stevens, Upmanu Lall Using Bayesian networks to model watershed mangement decisions: an East Canyon Creek case study Journal of Hydroinformatics, 2005.*
Jay R. Lund, Marion W. Jenkins Integrating Yield and Shortage Management under Multiple Uncertainties Journal of Water Resources Planning and Management, Sep. 2000.*

\* cited by examiner

*Primary Examiner*—Kamini S Shah
*Assistant Examiner*—Cuong V Luu
(74) *Attorney, Agent, or Firm*—Ladas & Parry LLP

(57) ABSTRACT

A simulation system is adapted to reside in a computing device for establishing reservoir operational rule curves. The simulation system simulates reservoir storages of consecutive time units of hydrological years based on initially assigned reservoir storages and corresponding reservoir hydrological data, and makes statistical data sets of corresponding relationship among the reservoir storages, water shortage parameters and probabilities. Further, the reservoir storages of the time units with specified water shortage parameters and probabilities are collected to generate storage trajectories that respectively comply with pre-specified demands, which are subsequently screened according to a specified screening criteria to obtain optimum rule curve sets that meet reservoir operational targets in a simple and effective manner.

16 Claims, 10 Drawing Sheets

SIMULATION SYSTEM AND METHOD FOR ESTABLISHING RESERVOIR OPERATIONAL RULE CURVES

CROSS-REFERENCE TO RELATED APPLICATION

This application claims priority of Taiwanese application no. 094138069, filed on Nov. 2, 2005.

BACKGROUND OF THE INVENTION

1. Field of the Invention

The invention relates to a simulation system and method, more particularly to a simulation system and method for establishing reservoir operational rule curves.

2. Description of the Related Art

For improving the water resources management, it is highly pursued to promote utilization of reservoir storage to lower the risk of water shortage.

In the prior art, reservoir operational rule curves are established either through a simulation method or a screening method. The underlying concept behind developing reservoir operational rule curves in the simulation method is that, under a preset project demand, reservoir storage level fluctuations as well as water shortage and overflow conditions for a plurality of time units are simulated so that, during actual supply of water, the amount of supplied water can be reduced at appropriate times whenever the reservoir storage level has dropped below a certain threshold. However, the process of developing operational rule curves in the simulation method is time consuming and labor intensive, and requires the skills of expert engineers who have abundant professional experience and sophisticated knowledge on the local hydrological background.

On the other hand, in the screening method, optimum storage trajectories are inferred from operational objective associated with an established optimum reservoir storage utilization model based on various data, such as water inflow amount, water demand amount, etc. Upon acquiring the optimum storage trajectories, reservoir storages with the same probabilities for each time unit are connected and, using various search methods and simulation models, simulation results of storage trajectories having different probabilities are compared to find the optimum reservoir operational rule curves. This method, however, takes up too much time and is only able to find a localized best solution.

Therefore, how to establish a simulation system capable of quickly and effectively establishing reservoir operational rule curves that are best suited to promote reservoir operational quality is a task currently being pursued by the water resource management sector.

SUMMARY OF THE INVENTION

The object of the present invention is to provide a simple and effective simulation system and method for establishing reservoir operational rule curves.

According to one aspect of the present invention, there is provided a simulation system adapted to reside in a computing device for establishing reservoir operational rule curves. The simulation system comprises a reservoir storage computing unit, a parameter computing unit, a statistical unit, a storage trajectory establishing unit, and a rule curve screening unit.

The reservoir storage computing unit receives initially assigned reservoir storages and corresponding hydrological data, and computes reservoir storages of consecutive time units of a plurality of simulation time periods under different initially assigned reservoir storages.

The parameter computing unit receives pre-specified demands, and computes respective water shortage parameters of the time units under each of the initially assigned reservoir storages based on the reservoir storages from the reservoir storage computing unit.

The statistical unit makes statistics of respective probabilities of the water shortage parameters, and statistical data sets of corresponding relationship among the reservoir storages, the water shortage parameters and the probabilities of a same time unit of the simulation time periods under different initially assigned reservoir storages.

The storage trajectory establishing unit retrieves, from the statistical data sets, values of the reservoir storages of the time units that have specified water shortage parameters and probabilities, and collects the values of the reservoir storages of the time units to generate storage trajectories that respectively comply with the pre-specified demands.

The rule curve screening unit combines the storage trajectories that comply with the different pre-specified demands to generate different operational rule curve sets, receives a specified screening criteria, and selects the operational rule curve sets that comply with the screening criteria.

According to another aspect of the present invention, there is provided a simulation method for establishing reservoir operational rule curves. The simulation method comprises the steps of:

a) building a simulation system capable of establishing the reservoir operational rule curves in a computing device, the simulation system being configured with a simulation routine for simulated screening of standard-compliant reservoir operational rule curves;

b) through an input unit of the computing device, inputting reservoir hydrological data, initially assigned reservoir storages, and a plurality of pre-specified demands, and enabling the simulation system to compute values of reservoir storages and water shortage parameters for consecutive time units under different initially assigned reservoir storages, and to make statistics of statistical data sets of corresponding relationship among the reservoir storages, the water shortage parameters and the probabilities of a same time unit under different initially assigned reservoir storages;

c) retrieving, from the statistical data sets, values of the reservoir storages of the time units that have specified water shortage parameters and probabilities, and collecting the values of the reservoir storages thus retrieved to establish storage trajectories that comply with the pre-specified demands; and d) inputting via the input unit a rule curve screening criteria such that the simulation system combines the storage trajectories that comply with the pre-specified demands to generate operational rule curve sets and selects the operational rule curve sets that comply with the screening criteria.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
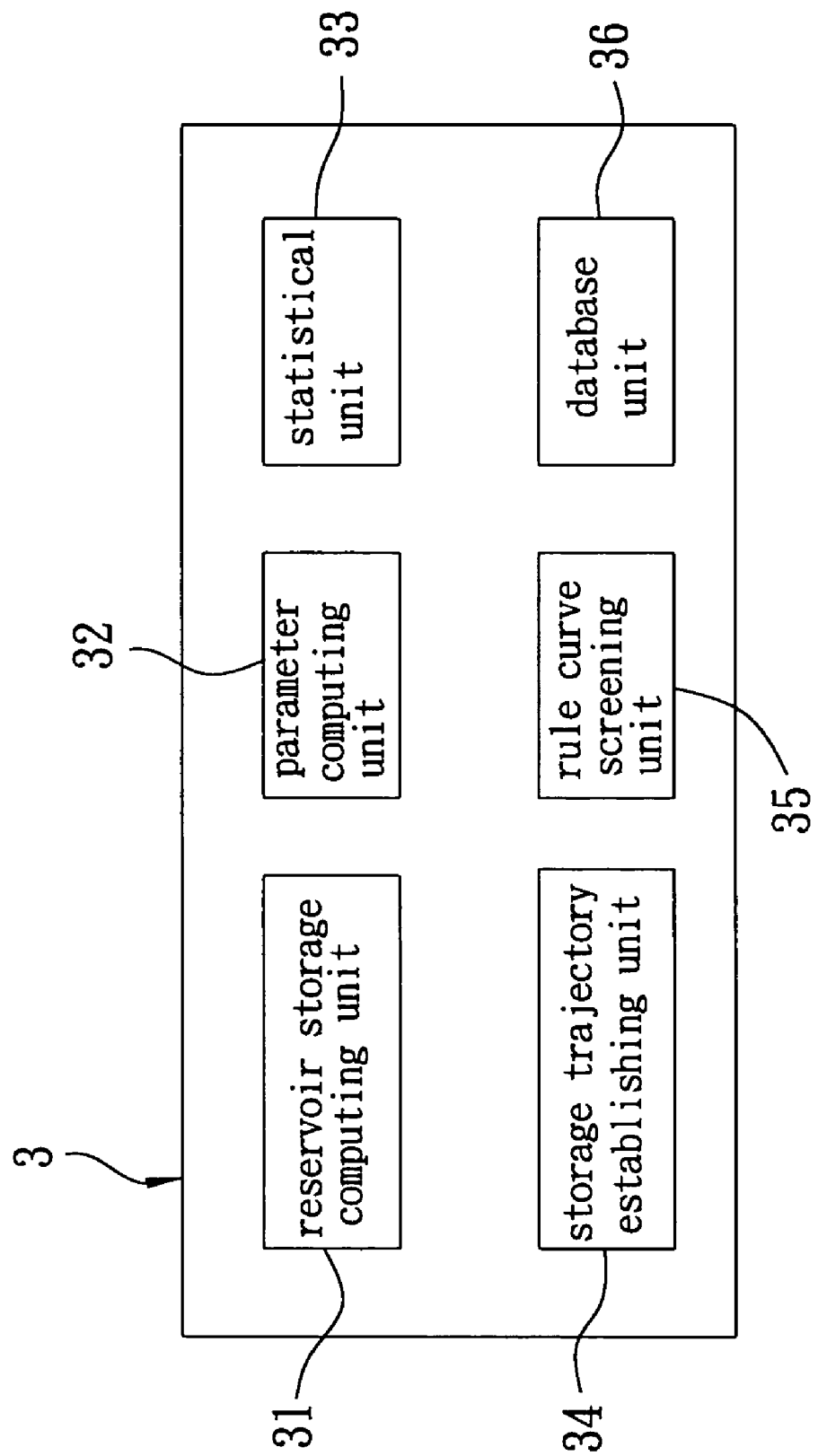
FIG. 1 is a system block diagram of the preferred embodiment of a simulation system for establishing reservoir operational rule curves according to the present invention.
Figure 2:
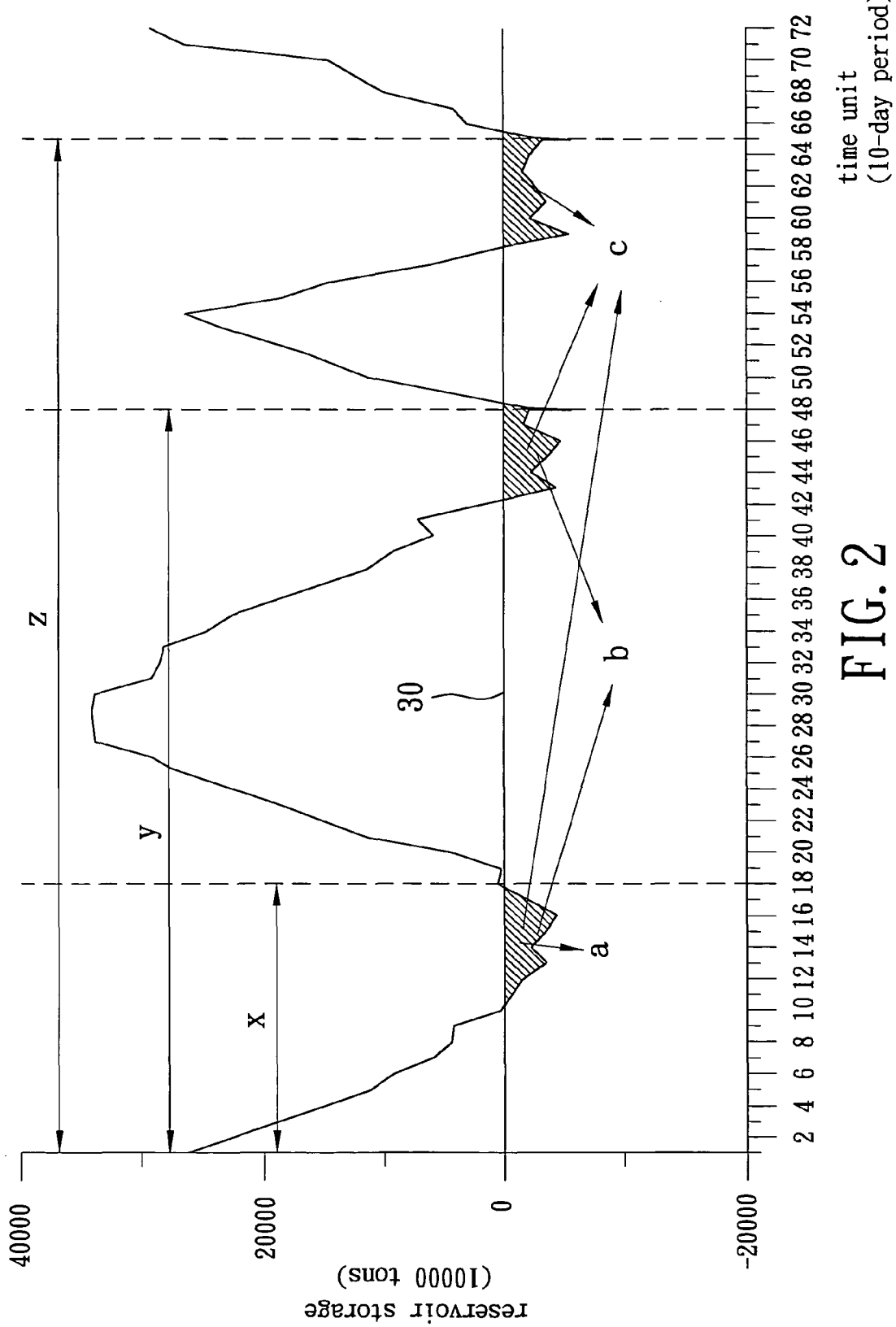
FIG. 2 illustrates an exemplary storage trajectory of a simulation time period of the preferred embodiment.

As shown in FIGS. 1 and 2, the preferred embodiment of a simulation system 3 for establishing reservoir operational rule curves according to the present invention is shown to be adapted to reside in and to be executed by a computing device (not shown), such as a computer, such that a user is able to input data or settings required by the simulation system 3 through a keyboard (not shown) or conventional forms of data transmission, and such that data generated by the simulation system 3 can be outputted through an output device, such as a display (not shown), a printer (not shown), etc. The simulation system 3 comprises a reservoir storage computing unit 31, a parameter computing unit 32, a statistical unit 33, a storage trajectory establishing unit 34, a rule curve screening unit 35, and a database unit 36.

The reservoir storage computing unit 31 has a built-in simulation computing program for reservoir storages such that the user is able to setup desired simulation time periods, basic time units of simulation time periods, initially assigned reservoir storages and reservoir hydrological data (e.g., effective capacity, inflow amount, evaporation amount, amount of water leakage, etc.), etc. Based thereon, the reservoir storage computing unit 31 computes reservoir storages of consecutive time units of a plurality of simulation time periods under different initially assigned reservoir storages. That is, first, an initially assigned reservoir storage is setup for the first time unit of each of the simulation time periods. Then, the reservoir storage of each time unit of each of the simulation time periods under the corresponding initially assigned reservoir storage is computed through simulation. In this manner, the reservoir storages of each time unit of each of the simulation time periods are computed for the different initially assigned reservoir storages.

In this embodiment, since the reservoir storage at the end of the dry period of each year will affect the water supply and the possibility of water shortage of the succeeding year, each simulation time period adopted by the reservoir storage computing unit 31 in this embodiment includes two hydrological years, in which one basic time unit of one hydrological year is a ten-day period such that one hydrological year includes thirty-six time units. Simulation for each simulation time period is to obtain storage data starting from the first time unit of the first hydrological year and ending at the last time unit of the second hydrological year, from which the progress of reservoir storage storing, water demand condition data, and respective initial storage data for each of the time units of the simulation time periods under different hydrological conditions and different initially assigned reservoir storages are obtained. The simulation algorithm for reservoir storage employed in the preferred embodiment is shown in the following Equation (1):

$$S'_{\tau+1} = S_\tau + R_\tau - Q_\tau - EV_\tau \qquad \text{Equation (1)}$$

$$S_{\tau+1} = \begin{cases} S_{max}, & EX_\tau = S_{\tau+1} - S_{max}, & SH_\tau = 0; & \text{if } S'_{\tau+1} > S_{max} \\ S'_{\tau+1}, & & SH_\tau = EX_\tau = 0; & \text{if } S_{min} \leq S'_{\tau+1} \leq S_{max} \\ S_{min}, & SH_\tau = S_{min} - S'_{\tau+1}, & EX_\tau = 0; & \text{if } S'_{\tau+1} < S_{min} \end{cases}$$

where:

$\tau$=time unit;

$S_\tau$=initial reservoir storage for the $\tau$th time unit;

$S_{\tau+1}$=initial reservoir storage for the $(\tau+1)$th time unit;

$R_\tau$=reservoir inflow amount;

$Q_\tau$=reservoir release amount;

$EV_\tau$=reservoir evaporation amount;

$S_{min}$=minimum reservoir storage amount for utilization;

$S_{max}$=maximum reservoir storage amount for utilization;

$SH_\tau$=water amount insufficient for project water release amount; and $EX_\tau$=extra water amount for project water release amount.

Since hydrological background differs for each location, the use of two hydrological years for computations is only for the purpose of illustrating the preferred embodiment, and should not be deemed to limit the present invention. Moreover, the simulation algorithm suitable for use in the present invention should not be limited to the aforesaid Equation (1). FIG. 2 illustrates an exemplary storage trajectory of a simulation time period that is outputted by the reservoir storage computing unit 31 under a specific initially assigned reservoir storage.

The parameter computing unit 32 receives pre-specified demands inputted by the user, and computes respective water shortage parameters of the time units under each of the initially assigned reservoir storages based on the reservoir storages from the reservoir storage computing unit 31. In this embodiment, the water shortage parameters generated by the parameter computing unit 32 include at least one of amounts of water that can be supplied, water shortage amounts, maximum water shortage amounts of time units, water shortage rates, average water shortage rates, maximum average water shortage rates, water shortage indices, numbers of days of emptied reservoir, etc. The maximum average water shortage rates are used to simulate reservoir operational rule curves. The concept of the maximum average water shortage rate is as follows:

For a reservoir storage curve computed under an initially assigned reservoir storage, if there is no emptied reservoir in the reservoir storage curve, i.e., there is no situation where the amount of water that can be supplied is smaller than the water demand amount, for such initially assigned reservoir storage, the average water shortage rates for the time units are zero. On the other hand, during the simulation time period, if there is a situation where the amount of water that can be supplied is smaller than the water demand amount, then water shortage has taken place. If no water restrictions are imposed during the process of supplying water, the reservoir will become empty.

Therefore, to avoid a serious situation of complete water shortage due to emptying of the reservoir and to soften the impact of water shortage, it is best to evenly distribute the expected water shortage amount among future time units so as to avoid emptying of the reservoir from occurring. The meaning behind maintaining an average water shortage rate is that, during a period of water shortage, the time units have the same water restriction ratio such that, when water demand is large, the water restriction amount is large as well, and vice versa. As for the water utilization amount, by maintaining an average water shortage rate, not only can emptying of the reservoir be avoided during the process of storing water, the water shortage condition can also be evenly distributed so that the burden of the same may be shared among the time units.

As shown in FIG. 2, areas of the reservoir storages under a zero reference line 30 respectively indicate that the time units are dry periods of the reservoir. Because a water shortage period may have characteristics of discontinuity and non-exclusiveness, when computing the average water shortage rate of a reservoir, situations where the dry period consists of only one time unit of water shortage or multiple intermittent units of water shortage must all be covered. That is, for a specified initial reservoir storage, not only should the subsequent first period of water shortage be regulated, it is desired to regulate all of the time periods that can reduce the severity of water shortage and that are within the scope of reservoir storages that can be regulated so as to reduce the impact of water shortage.

Assuming that there are (x) time units from the starting time period of simulation to the end of the first emptied reservoir time period, and that the water shortage amount is (a), in order to avoid the situation of an emptied reservoir from taking place, it is required to distribute proportionally the water shortage amount (a) among the (x) time units according to magnitudes of the water demand amounts of the (x) time units such that each of the time units has a same water restriction deduction before the end of the (xth) time unit. Further, since the storage at the end of the emptied reservoir cannot be provided for use during the water shortage period that occurred beforehand, the reservoir storages after the (xth) time unit are not used for computation of the average water shortage rate (ASR). In this embodiment, the ASR is computed according to the following Equation (2):

$$ASR = \frac{a}{D_x} \qquad \text{Equation (2)}$$

where $D_x$=total project demand amount from starting 10-day period of simulation to (xth) time unit.

When there are multiple water shortage periods, the maximum average water shortage rate for the starting time unit of simulation under a predetermined initially assigned reservoir storage is represented by a maximum value of the set of average water shortage rates, each starting from the starting time unit of simulation to the end of the respective period of emptied reservoir, and is defined by the following Equation (3):

$$ASR = \text{MAX}\left[\frac{a}{D_x}, \frac{a+b}{D_y}, \frac{a+b+c}{D_z}, \ldots\right] \qquad \text{Equation (3)}$$

where:

a=water shortage amount spanning from the start of simulation to the (xth) time unit;

b=water shortage amount spanning from the start of simulation to the (yth) time unit;

c=water shortage amount spanning from the start of simulation to the (zth) time unit;

$D_x$=total project demand amount spanning from the start of simulation to the (xth) time unit;

$D_y$=total project demand amount spanning from the start of simulation to the (yth) time unit; and $D_z$=total project demand amount spanning from the start of simulation to the (zth) time unit.

In other words, the maximum average water shortage rate represents the most serious water shortage burden of the initially assigned reservoir storages under different hydrological year conditions.

The statistical unit 33 makes statistics of the average water shortage rates generated by the parameter computing unit 32, and outputs statistical data sets of corresponding relationship among the reservoir storages, the average water shortage rates and the water shortage probabilities of a same time unit of calendar years.

Figure 3:
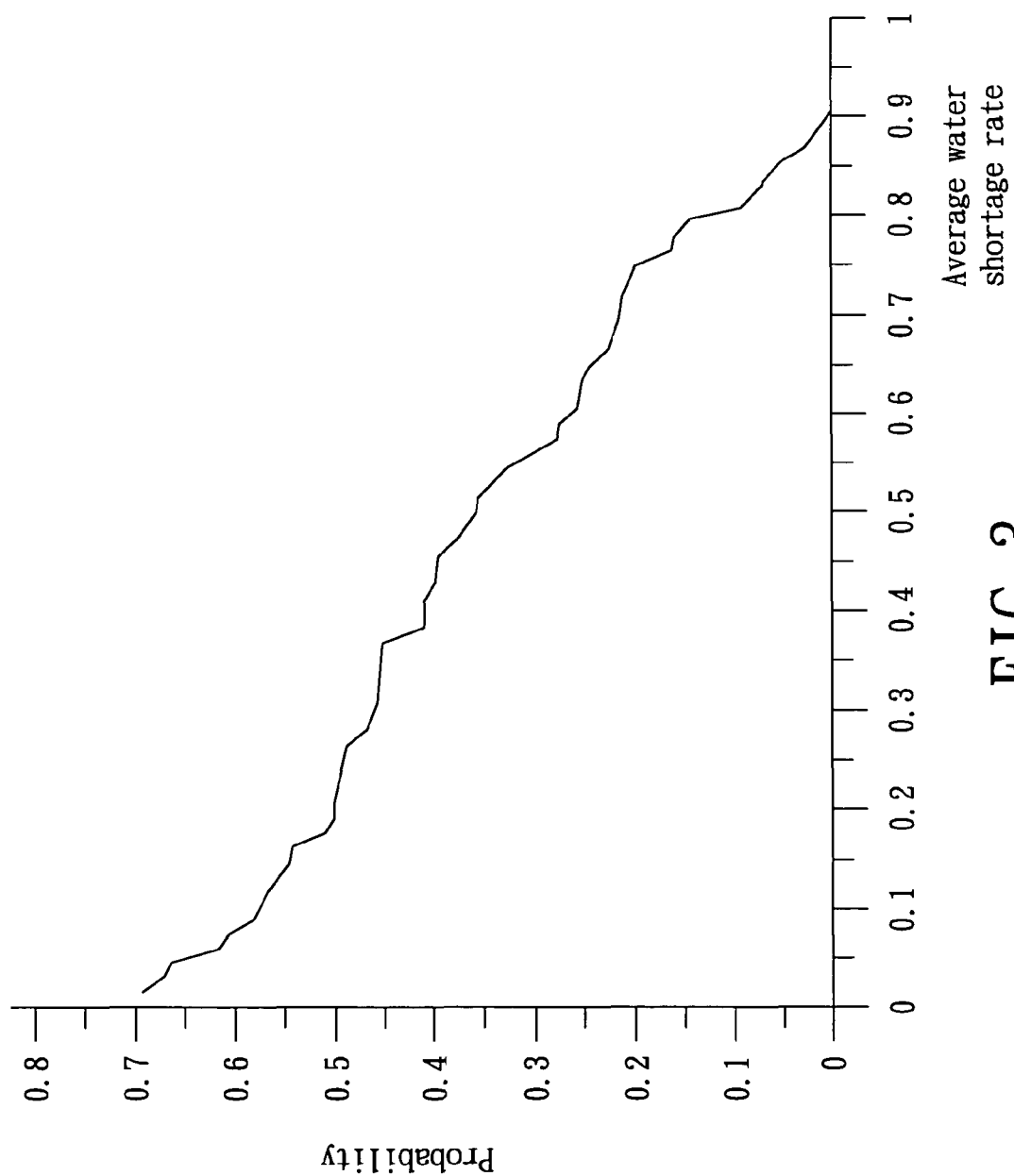
FIG. 3 is a plot illustrating an exemplary relation between an average water shortage parameter and a probability thereof for a specific time unit under an initially assigned reservoir storage in the preferred embodiment.
Figure 4:
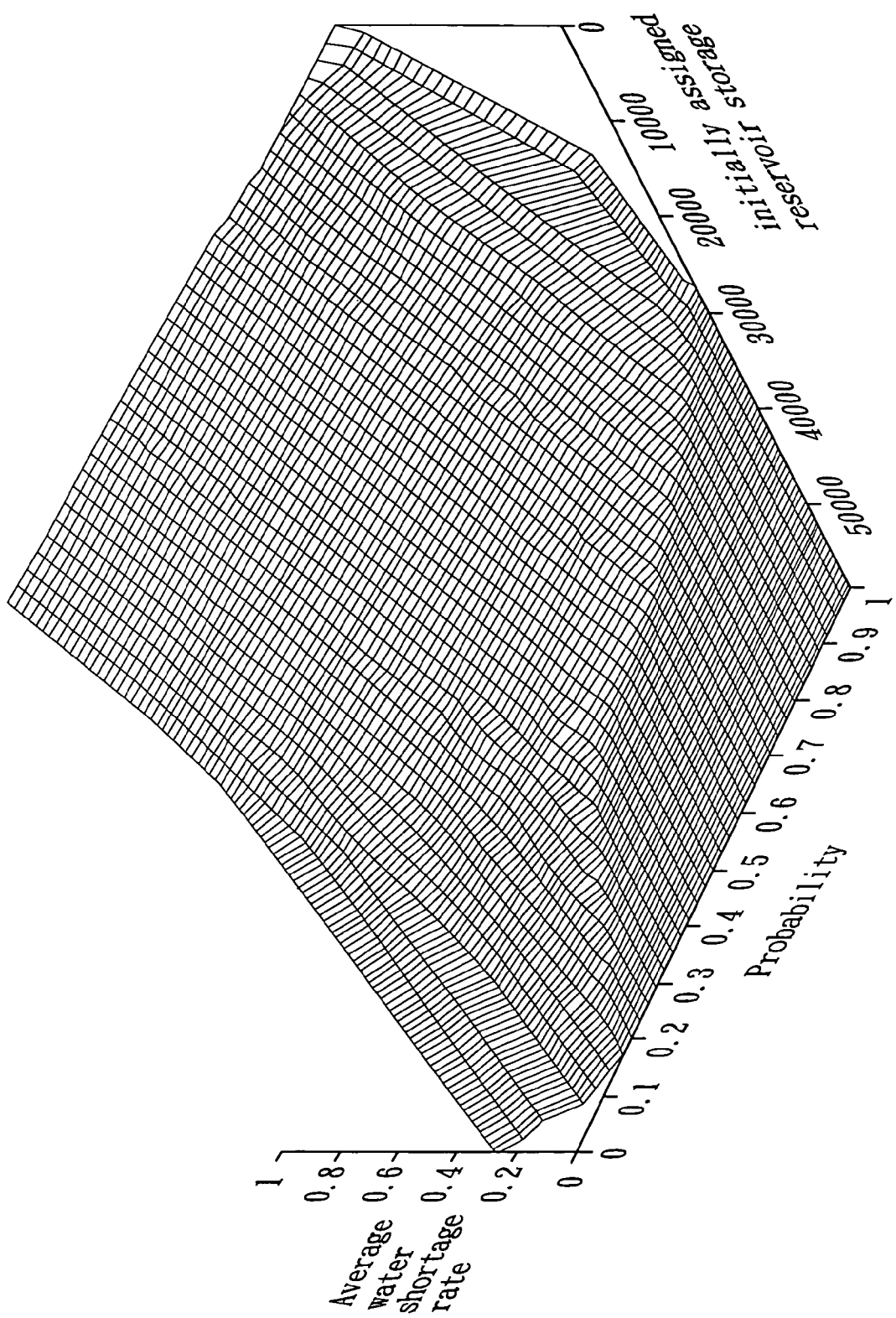
FIG. 4 illustrates an exemplary relation between an average water shortage parameter and a probability thereof for a specific time unit under different initially assigned reservoir storages in the preferred embodiment.

Under different hydrological conditions, even if the initially assigned reservoir storages are the same, the amounts and probabilities of subsequent water shortage will differ for each initially assigned reservoir storage. By applying probability distribution computation schemes, the relationship between the maximum average water shortage rate and a probability thereof for a same time unit of calendar years can be calculated under a predetermined initially assigned reservoir storage, as shown in FIG. 3. By collecting the curves representing the relationship between the maximum average water shortage rate and the probability thereof under different initially assigned reservoir storages, a three-dimensional distribution curve for the relationship among the maximum average water shortage rates, the probabilities and the reservoir storages of a same time unit of calendar years under different initially assigned reservoir storages can be obtained. Since, as described in the foregoing, each hydrological year has thirty-six ten-day time periods, statistical data sets of thirty-six three-dimensional distribution curves similar to FIG. 4 can be established for each hydrological year.

Figure 5:
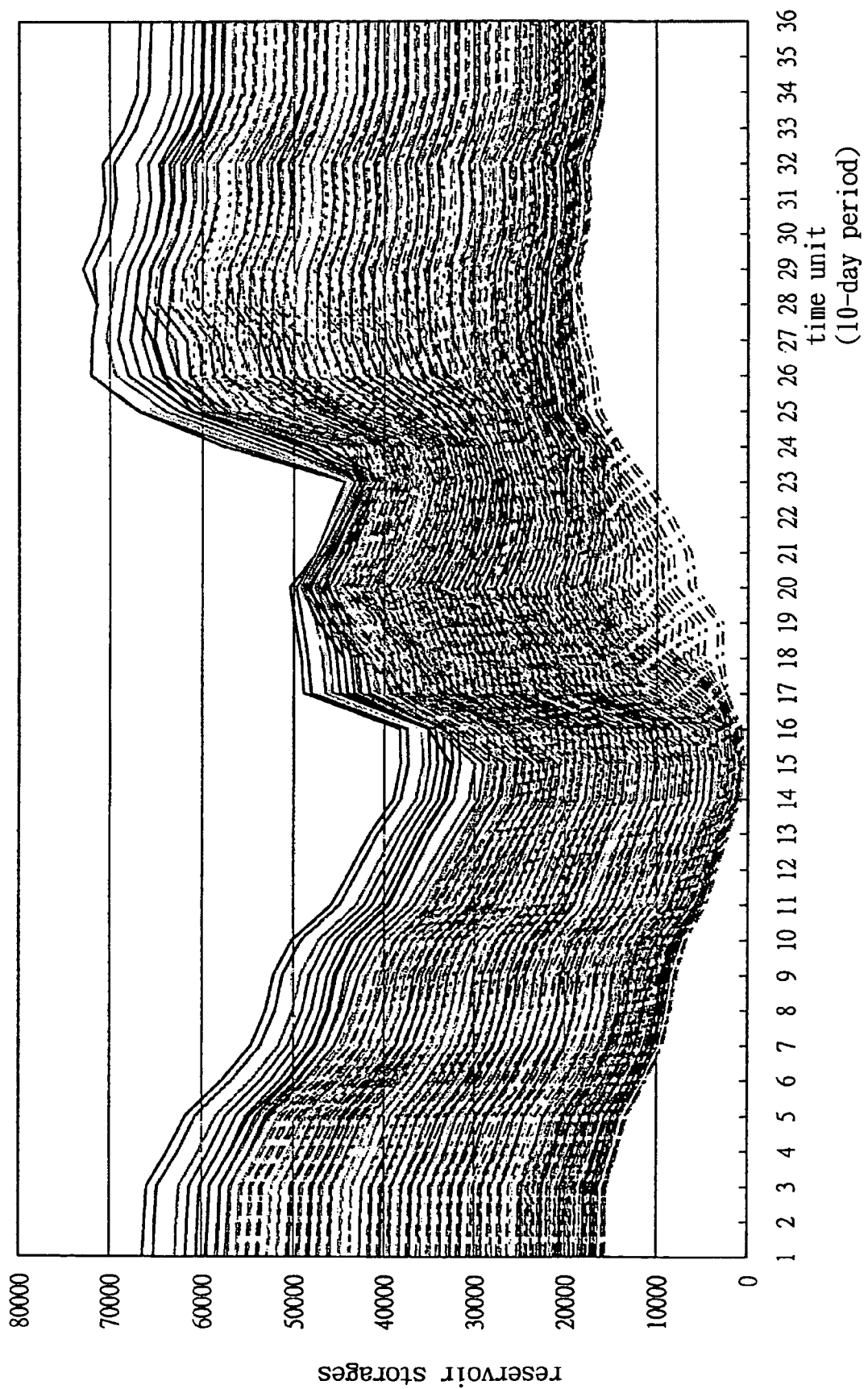
FIG. 5 illustrates a collection of storage trajectories of the time units with the maximum water shortage parameter and the same probability under a pre-specified demand according to the preferred embodiment.

The storage trajectory establishing unit 34 finds, from the statistical data sets established by the statistical unit 33 and with reference to specified values of maximum water shortage rate and probability set up by the user for the different pre-specified demands, values of the reservoir storages of the first to thirty-sixth time units of the hydrological year that have the specified maximum water shortage rate and probability, and collects the values of the reservoir storages thus found to generate storage trajectories that respectively comply with the pre-specified demands and that have the specified maximum average water shortage rate and probability, as shown in FIG. 5.

The rule curve screening unit 35 combines the storage trajectories that comply with the different pre-specified demands to generate different operational rule curve sets and, with reference to screening criteria inputted by the user, selects the operational rule curve sets that comply with the screening criteria.

In this embodiment, each of the operational rule curve sets generated by the rule curve screening unit 35 is composed of three of the storage trajectories that respectively comply with three different pre-specified demands, i.e., an upper limit standard, a middle limit standard, and a lower limit standard. When the reservoir storage is higher than the upper limit, the reservoir is full and is not only capable of fulfilling the targeted normal water demand amount, but is also capable of providing extra supply of water. When the reservoir storage is between than the upper limit and the middle limit, the reservoir is capable of fulfilling the normal water demand amount, but is not capable of providing extra supply of water. When the reservoir storage is between than the middle limit and the lower limit, the reservoir faces the possibility of being empty, and first-stage water restriction measures must be implemented. When the reservoir storage is below the lower limit, water in the reservoir is no longer sufficient for the first-stage water restriction standard, and more stringent second-stage water restriction measures must be implemented.

In this embodiment, to ensure reliability of each targeted normal water supply, the upper limit of the rule curves is selected from a plurality of the storage trajectories that respectively meet the normal water supply condition. In the same token, the middle limit and lower limit of the rule curves are selected from a plurality of the storage trajectories that meet the first-stage water restriction condition and the second-stage water restriction condition, respectively. However, these should not be imposed as limiting the present invention in practice.

During selection of the operational rule curve sets, the rule curve screening unit 35 will operate to simulate use of reservoir storage according to the operational rule curve sets and, using reservoir system operational indices such as water shortage indices, power generating amount, days of emptied reservoir, time units of water shortage, water supply amount, water shortage amount, water overflow amount, etc., as screening criteria, the operational rule curve set that complies with the optimum operational target is selected.

The database unit 36 is used for storing hydrological data and relevant configuration information that were inputted into the computing device by the user, as well as data generated by the various units 31-35 for use by the user, or for computations by the other units 31-35. In practice, the database unit 36 is optional.

Figure 6:
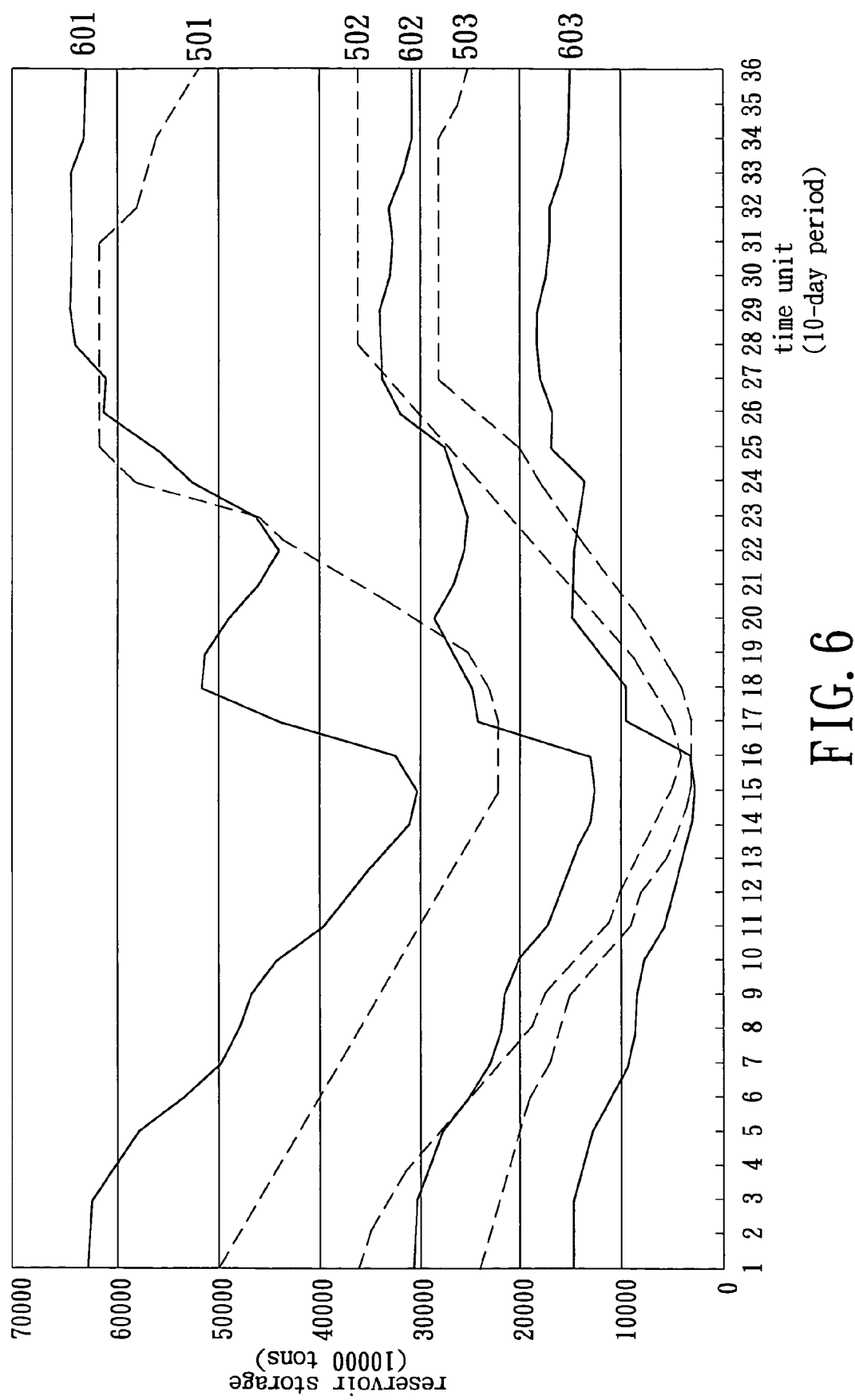
FIG. 6 is a graph for illustrating comparison between a water supply rule curve set computed by the preferred embodiment and a MT10 rule curve set.
Figure 7:
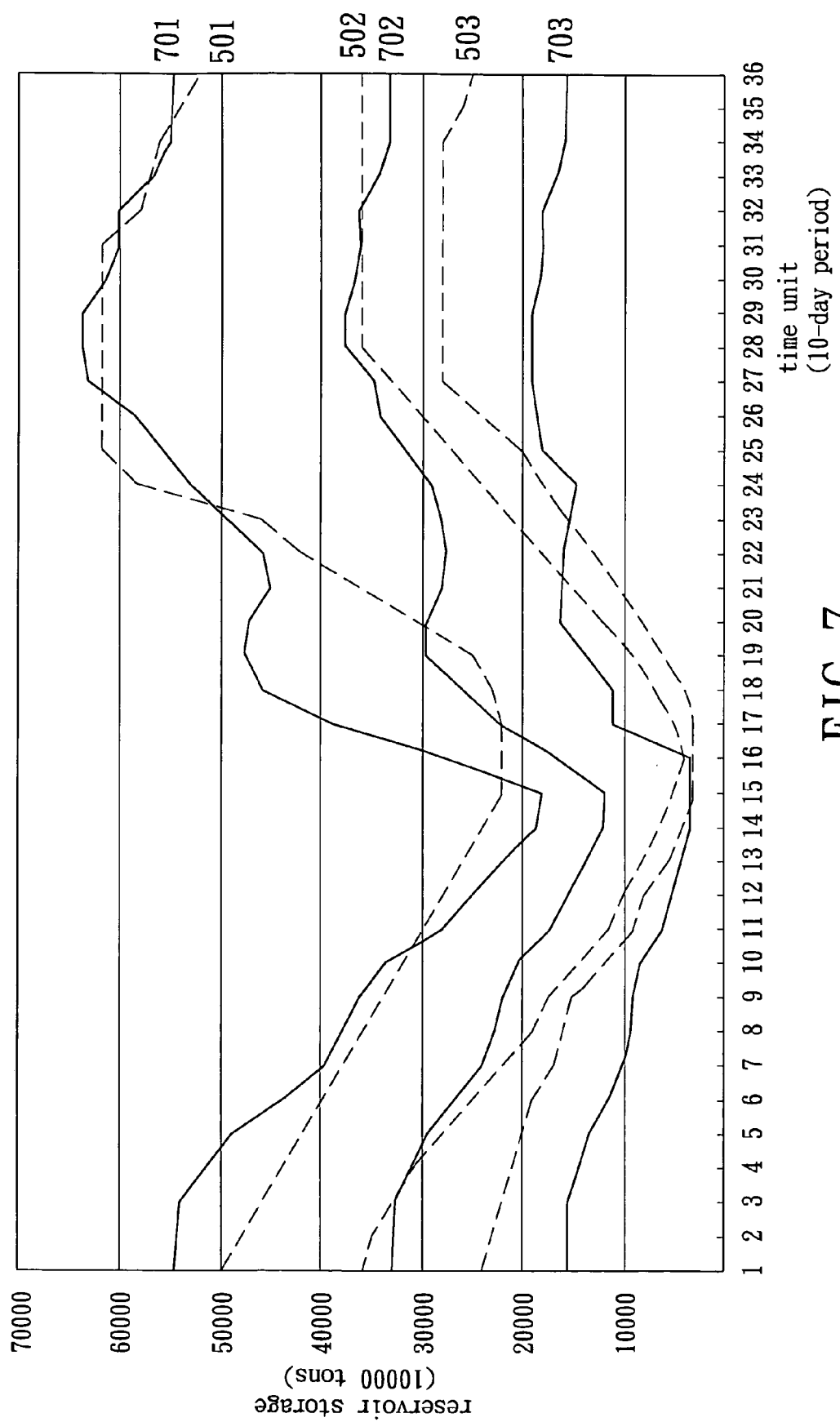
FIG. 7 is a graph for illustrating comparison between a power generation rule curve set computed by the preferred embodiment and a MT10 rule curve set.
Figure 8:
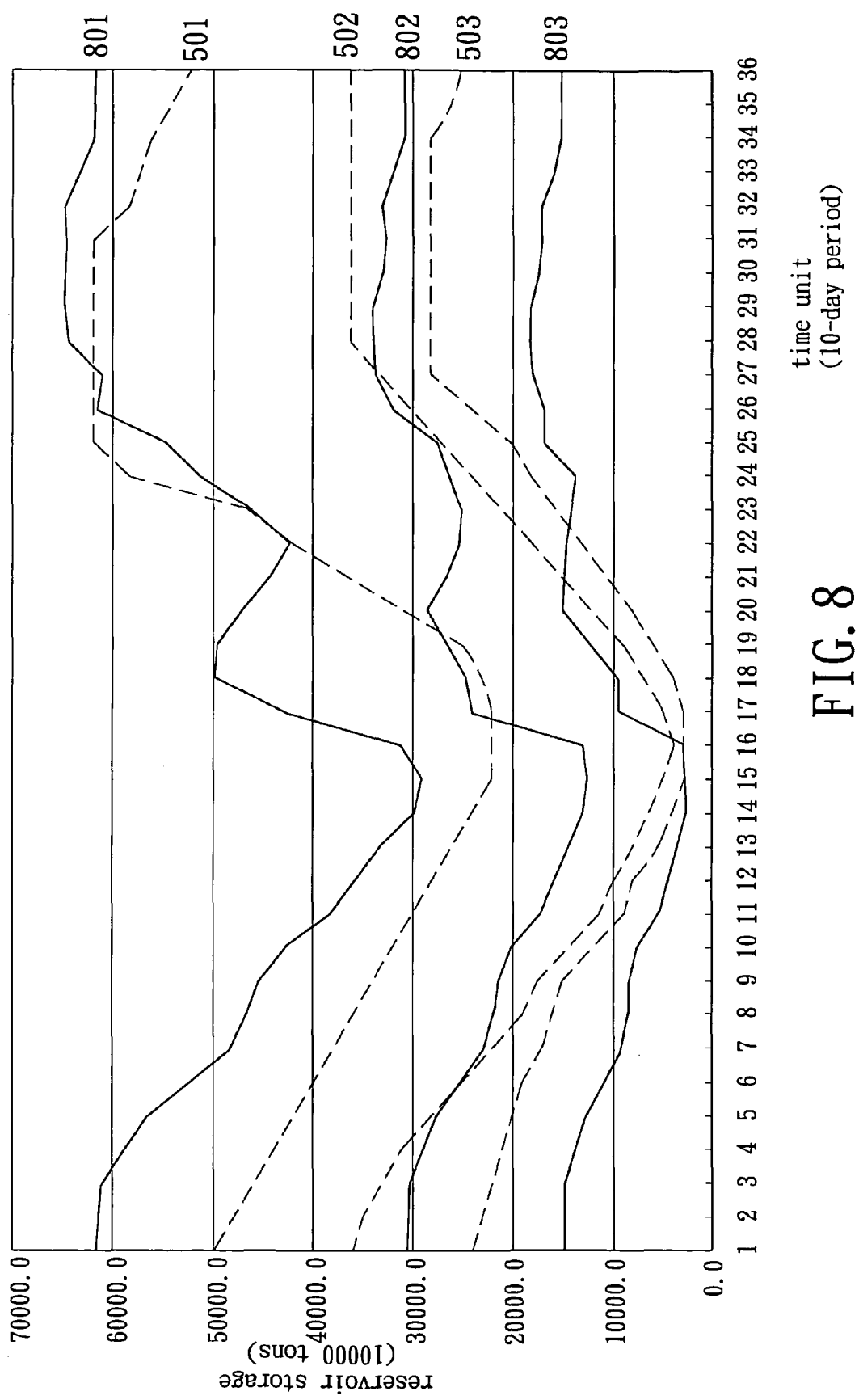
FIG. 8 is a graph for illustrating comparison between a suggested rule curve set computed by the preferred embodiment and a MT10 rule curve set.

In FIGS. 6 to 8, a current MT10 rule curve set is used as a basis for comparison to evaluate the reservoir operational rule curves established according to this invention. The MT10 rule curve set includes an upper limit rule curve 501, a middle limit rule curve 502 and a lower limit rule curve 503. It is noted that this invention is able to selectively provide a rule curve set targeted for maximum average water supply as a water supply curve set, and to determine a power generation rule curve set targeted for maximum amount of generated power, both of which are superior to the MT10 rule curve set. In practice, values of upper limit rule curves 601, 701, middle limit rule curves 602, 702 and lower limit rule curves 603, 703 of the average water shortage rates and probabilities of the water supply and power generation rule curve sets may be altered according to actual requirements and should not be limited to what is disclosed herein. Moreover, a suggested rule curve set that is likewise superior to the MT10 rule curve set and that has benefits of both the water supply rule curve set and the power generation rule curve set can be selected and includes an upper limit rule curve 801, a middle limit rule curve 802 and a lower limit rule curve 803.

Figure 9:
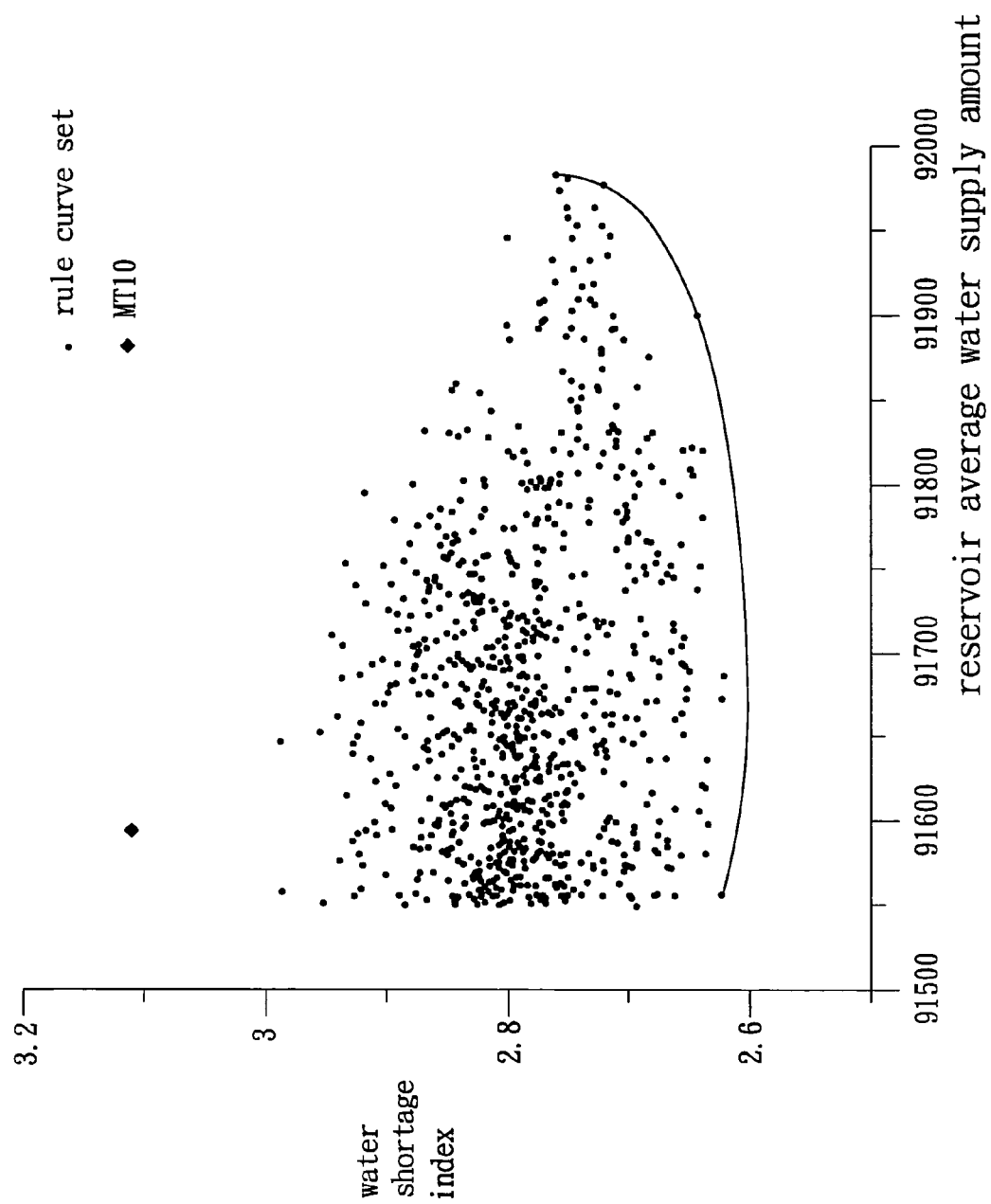
FIG. 9 is a graph for illustrating that rule curve sets computed by the preferred embodiment have better operational effect than a MT10 rule curve set.

It is apparent from the following Table 1 that: the water supply, power generation and suggested rule curve sets established according to the present invention all provide more water supply amounts than the MT10 rule curve set; the water supply rule curve set has the best average water supply amount; the power generation rule curve set has the best amount of generated power; and the suggested rule curve set has benefits of both the water supply and power generation rule curve sets. Moreover, water supply performances under the hydrological conditions of one drought cycle in five years and one drought cycle in ten years are better as compared to those of the MT10 rule curve set. As shown in FIG. 9, each dot represents a candidate rule curve set. This invention can find several rule curve sets whose operational effects are better than those of the existing MT10 rule curve set. A policy maker can then select a set of operational rule curves that can achieve optimum operational targets.

TABLE 1

Comparison of simulation results among the water supply, power generation, suggested and MT10 rule curve sets under various water utilization targets

| Compared Item | MT10 rule curve | Suggested rule curve | Water Supply rule curve | Power generation rule curve |
|---|---|---|---|---|
| Total time units of emptied reservoir | 27 | 28 | 27 | 23 |
| Maximum consecutive time units of emptied reservoir | 11 | 16 | 9 | 7 |
| Total water shortage time units | 531 | 546 | 543 | 596 |
| Maximum consecutive time units of water shortage | 21 | 36 | 27 | 27 |
| Annual projected water supply amount | 104,700 | 104,700 | 104,700 | 104,700 |
| Annual average water supply amount | 96,483 | 96,957 | 97,023 | 96,500 |
| Annual average water shortage amount | 8,217 | 7,743 | 7,677 | 8,200 |
| Average annual water overflow amount (Reservoir A) | 13,066 | 15,706 | 16,070 | 14,840 |
| Average annual water overflow amount (Reservoir B) | 18,092 | 17,613 | 17,558 | 18,052 |
| Average annual power generation amount | 24,046 | 24,106 | 24,063 | 24,192 |
| Water shortage amount (one | 88,796 | 90,895 | 90,895 | 90,895 |

TABLE 1-continued

Comparison of simulation results among the water supply, power generation, suggested and MT10 rule curve sets under various water utilization targets

| Compared Item | MT10 rule curve | Suggested rule curve | Water Supply rule curve | Power generation rule curve |
|---|---|---|---|---|
| drought in five years) | | | | |
| Water shortage amount (one drought in ten years) | 75,723 | 80,140 | 80,140 | 80,140 |
| Annual water shortage index | 2.13 | 1.65 | 1.65 | 1.72 |

Units:
Water - 10,000 tons;
Power - 10,000 watts

Figure 10:
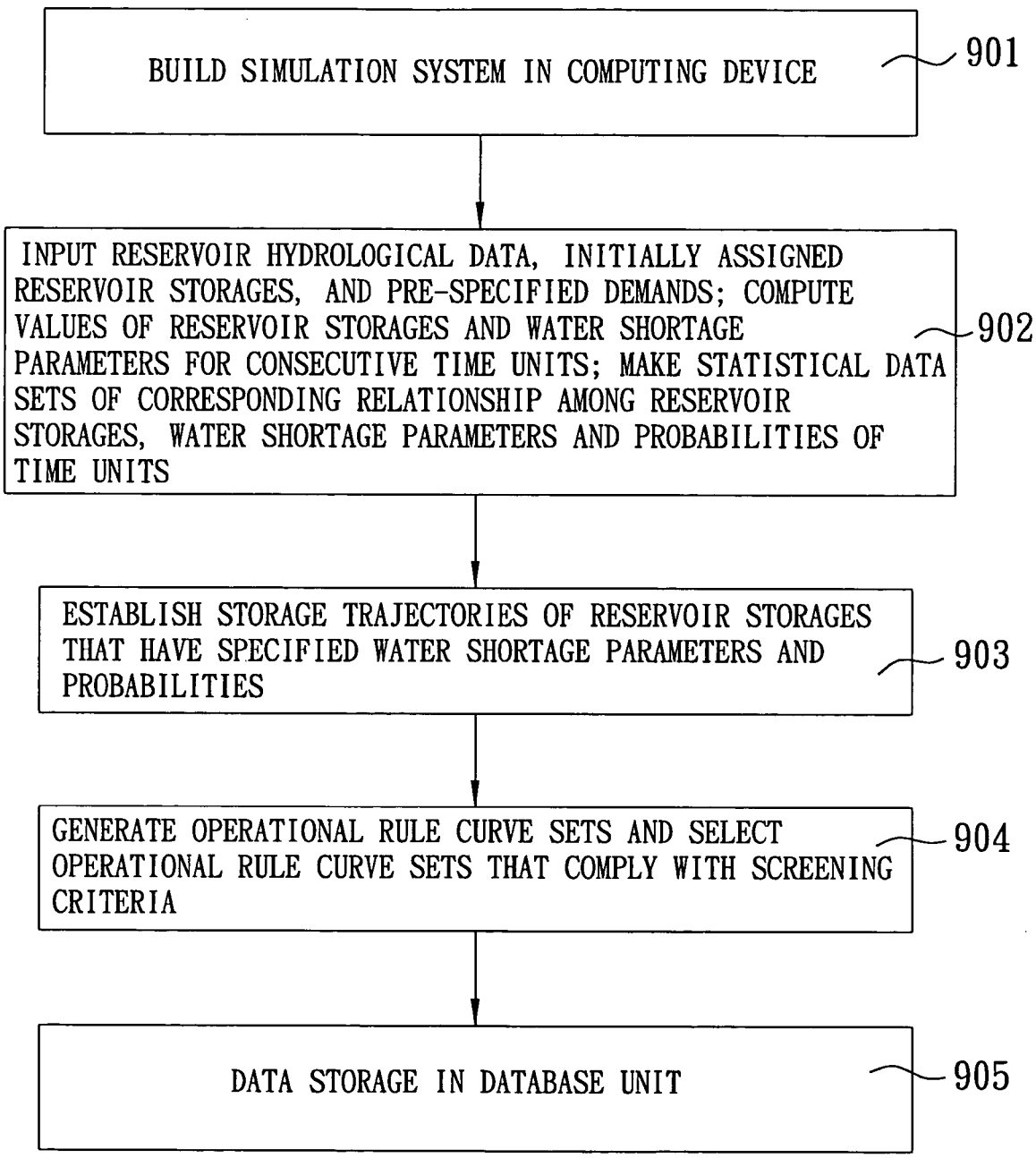
FIG. 10 is a flowchart of the preferred embodiment of a simulation method for establishing reservoir operational rule curves according to the present invention.

As shown in FIG. 10, the preferred embodiment of a simulation method for establishing reservoir operational rule curves according to the present invention comprises the following steps:

First, in step 901, the aforesaid simulation system 3 capable of establishing the reservoir operational rule curves is built in a computing device. Next, as shown in step 902, through an input unit of the computing device, reservoir hydrological data, initially assigned reservoir storages, and a plurality of pre-specified demands are inputted into the simulation system 3. Then, through the reservoir storage computing unit 31 and the parameter computing unit 32 of the simulation system 3, values of reservoir storages and water shortage parameters for consecutive time units under different initially assigned reservoir storages are computed. The statistical unit 33 is subsequently used to make statistics of statistical data sets of corresponding relationship among the reservoir storages, the water shortage parameters and the probabilities of a same time unit of simulation time periods under different initially assigned reservoir storages.

Next, as shown in step 903, the user can use the input unit to input specific water shortage parameters and probabilities into the storage trajectory establishing unit 34 of the simulation system 3 so that the storage trajectory establishing unit 34 is able to retrieve, from the statistical data sets, values of the reservoir storages of the time units that have the specified water shortage parameters and probabilities, and to collect the values of the reservoir storages thus retrieved so as to establish storage trajectories that comply with the pre-specified demands.

Then, as shown in step 904, the user uses the input unit to input a rule curve screening criteria such that the rule curve screening unit 35 combines the storage trajectories that comply with the pre-specified demands to generate operational rule curve sets and selects the operational rule curve sets that comply with the screening criteria. At this time, the user has the option of outputting the selected operational rule curve set using the output unit of the computing device for reference by a policy maker.

Finally, as shown in step 905, the user is able to store data generated by the aforesaid units 31-35 in the database unit 36 of the simulation system 3.

In sum, this invention provides a simple and effective simulation system and method that can increase the efficiency in establishing optimum reservoir operational rule curve sets, which can ensure operational quality and benefits to meet various operational targets (such as water supply amount, power generation amount, etc.), and which are available for selection by a policy maker, while minimizing trial-and-error computations to save both time and manpower in analysis of rule curve sets.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A simulation system including a computer processor and a memory, said system establishing reservoir operational rule curves, said simulation system comprising:
   a reservoir storage computing unit for receiving initially assigned reservoir storages and corresponding hydrological data, and for computing, by the computer processor, reservoir storages of consecutive time units of a plurality of simulation time periods under different initially assigned reservoir storages;
   a parameter computing unit for receiving pre-specified demands, and for computing respective water shortage parameters of the time units under each of the initially assigned reservoir storages based on the reservoir storages from said reservoir storage computing unit;
   a statistical unit for making statistics of respective probabilities of the water shortage parameters, and statistical data sets of corresponding relationship among the reservoir storages, the water shortage parameters and the probabilities of the water shortage parameters for a same time unit of the simulation time periods under different initially assigned reservoir storages;
   a storage trajectory establishing unit for retrieving, from the statistical data sets, values of the reservoir storages of the time units that have specified water shortage parameters and respective probabilities of the specified water shortage parameters, and for collecting the values of the reservoir storages of the time units to generate storage trajectories that respectively comply with the pre-specified demands; and
   a rule curve screening unit for combining the storage trajectories that comply with the different pre-specified demands to generate different operational rule curve sets, for receiving a specified screening criteria, and for selecting the operational rule curve sets that comply with the screening criteria.

2. The simulation system as claimed in claim 1, wherein one simulation time period adopted by said reservoir storage computing unit includes a plurality of hydrological years, one hydrological year including thirty-six time units, each time unit being a ten-day period.

3. The simulation system as claimed in claim 2, wherein the water shortage parameters generated by said parameter computing unit include at least one of amounts of water that can be supplied, water shortage amounts, maximum water shortage amounts of the time units, water shortage rates, average water shortage rates, maximum average water shortage rates, water shortage indices, and numbers of days of emptied reservoir.

4. The simulation system as claimed in claim 3, wherein said statistical unit makes statistics of the statistical data sets of corresponding relationship among the average water shortage rates, the probabilities of water shortage and the reservoir storages of a same time unit of the simulation time periods under different initially assigned reservoir storages based on the average water shortage rates computed by said parameter computing unit.

5. The simulation system as claimed in claim 4, wherein said statistical unit makes statistics of the statistical data sets of corresponding relationship among the average water shortage rates, the probabilities of water shortage and the reservoir storages of a same time unit of calendar years under different initially assigned reservoir storages based on the average water shortage rates computed by said parameter computing unit.

6. The simulation system as claimed in claim 5, wherein said storage trajectory establishing unit retrieves, from the statistical data sets, values of the reservoir storages of the time units of one hydrological year that have specified maximum average water shortage rates and water shortage probabilities, and collects the values of the reservoir storages thus retrieved to generate the storage trajectories.

7. The simulation system as claimed in claim 6, wherein each of the operational rule curve sets generated by said rule curve screening unit is composed of three of the storage trajectories that comply with the different pre-specified demands.

8. The simulation system as claimed in claim 7, further comprising a database unit for data storage.

9. The simulation system as claimed in claim 1, wherein the water shortage parameters generated by said parameter computing unit include at least one of amounts of water that can be supplied, water shortage amounts, maximum water shortage amounts of the time units, water shortage rates, average water shortage rates, maximum average water shortage rates, water shortage indices, and numbers of days of emptied reservoir.

10. The simulation system as claimed in claim 1, wherein said statistical unit makes statistics of the statistical data sets of corresponding relationship among average water shortage rates, probabilities of water shortage and the reservoir storages of a same time unit of the simulation time periods under different initially assigned reservoir storages based on the average water shortage rates computed by said parameter computing unit.

11. The simulation system as claimed in claim 1, wherein said statistical unit makes statistics of the statistical data sets of corresponding relationship among average water shortage rates, probabilities of water shortage and the reservoir storages of a same time unit of calendar years under different initially assigned reservoir storages based on the average water shortage rates computed by said parameter computing unit.

12. The simulation system as claimed in claim 1, wherein said storage trajectory establishing unit retrieves, from the statistical data sets, values of the reservoir storages of the time units of one hydrological year that have specified maximum average water shortage rates and water shortage probabilities, and collects the values of the reservoir storages thus retrieved to generate the storage trajectories.

13. The simulation system as claimed in claim 1, wherein each of the operational rule curve sets generated by said rule curve screening unit is composed of three of the storage trajectories that comply with the different pre-specified demands.

14. The simulation system as claimed in claim 1, further comprising a database unit for data storage.

15. A simulation method for establishing reservoir operational rule curves, comprising the steps of:
 a) building a simulation system capable of establishing the reservoir operational rule curves in a computing device, the simulation system being configured with a simulation routine for simulated screening of standard-compliant reservoir operational rule curves;
 b) through an input unit of the computing device, inputting reservoir hydrological data, initially assigned reservoir storages, and a plurality of pre-specified demands into the simulation system, and enabling the simulation system to compute values of reservoir storages and water shortage parameters for consecutive time units under different initially assigned reservoir storages, and to make statistics of statistical data sets of corresponding relationship among the reservoir storages, the water shortage parameters and the probabilities of the water shortage parameters for a same time unit under different initially assigned reservoir storages;
 c) retrieving, from the statistical data sets, values of the reservoir storages of the time units that have specified water shortage parameters and respective probabilities of the specified water shortage parameters, and collecting the values of the reservoir storages thus retrieved to establish storage trajectories that comply with the pre-specified demands; and
 d) inputting via the input unit a rule curve screening criteria such that the simulation system combines the storage trajectories that comply with the pre-specified demands to generate operational rule curve sets and selects the operational rule curve sets that comply with the screening criteria.

16. The simulation method as claimed in claim 15, wherein data generated in steps b), c) and d) are stored in a database unit of the simulation system.

* * * * *